United States Patent [19]

Chambers

[11] Patent Number: 5,469,207
[45] Date of Patent: Nov. 21, 1995

[54] METHOD OF LABELLING A BROADCAST SIGNAL INCLUDING TRANSMITTING A SEQUENCE OF PROGRAM LABELS

[75] Inventor: John P. Chambers, Tadworth, United Kingdom

[73] Assignee: British Broadcasting Corporation, London, United Kingdom

[21] Appl. No.: 174,190

[22] Filed: Dec. 27, 1993

Related U.S. Application Data

[63] Continuation-in-part of Ser. No. 741,471, Aug. 5, 1991, abandoned.

[30] Foreign Application Priority Data

Dec. 6, 1989 [GB] United Kingdom ............. 8927615

[51] Int. Cl.$^6$ ....................................... H04H 1/00
[52] U.S. Cl. ...................... 348/9; 348/5; 348/460; 455/4.1; 455/6.3; 358/335
[58] Field of Search ............... 455/4.1, 4.2, 6.1, 455/6.2, 6.3, 171.1, 181.1, 352; 348/4–5, 7, 9–10, 460; 360/33.1; 358/335

[56] References Cited

U.S. PATENT DOCUMENTS

| | | | |
|---|---|---|---|
| 4,170,782 | 10/1979 | Miller | 348/1 |
| 4,305,101 | 12/1981 | Yarbrough et al. | 360/69 |
| 4,598,288 | 7/1986 | Yarbrough et al. | 348/1 |
| 4,787,063 | 11/1988 | Muguet | 360/9.1 |
| 4,891,703 | 1/1990 | Noudan | 348/460 |
| 4,908,707 | 3/1990 | Kinghorn | 348/460 |
| 4,908,713 | 3/1990 | Levine | 358/335 |
| 4,977,455 | 12/1990 | Young | 348/460 |

FOREIGN PATENT DOCUMENTS

| | | |
|---|---|---|
| 0133985B1 | 7/1984 | European Pat. Off. . |
| 0133985 | 3/1985 | European Pat. Off. . |
| 0214326 | 9/1985 | European Pat. Off. . |
| 0255108 | 2/1988 | European Pat. Off. . |
| 0312795 | 4/1989 | European Pat. Off. . |
| 0328440 | 8/1989 | European Pat. Off. . |
| 3328001A1 | 2/1985 | Germany . |
| 1117578 | 5/1989 | Japan . |
| 0166678 | 6/1989 | Japan . |
| 2207314 | 1/1989 | United Kingdom . |
| 2215928 | 9/1989 | United Kingdom . |
| 2238925 | 7/1991 | United Kingdom . |

OTHER PUBLICATIONS

J. P. Chambers, "A Domestic Television Programme Delivery Service Based on Teletext, 5. Conference and Exhibition on Television Techniques", Jun. 1990.

Lentzer et al., "Integrated Video Programming System (VPS) Decoder", 8028 Electronic Components & Applications 8 (1987) No. 1, Eindhover, The Netherlands.

Hoffman et al., "WDR–Videotext", Manuskript eingegangen am 6 Oct. 1987.

*Primary Examiner*—Edward F. Urban
*Assistant Examiner*—Andrew Faile
*Attorney, Agent, or Firm*—Kevin J. Fournier

[57] ABSTRACT

A method of labelling a broadcast signal in which a predetermined pattern of special labels, preferably, a label for the next following program is transmitted repeatedly but irregularly at predetermined intervals prior to the program change to indicate that an event is to occur after a predetermined interval.

7 Claims, 1 Drawing Sheet time → time →

METHOD OF LABELLING A BROADCAST SIGNAL INCLUDING TRANSMITTING A SEQUENCE OF PROGRAM LABELS

This is a continuation-in-part of application Ser. No. 07/741,471 filed on Aug. 5, 1991 abandoned.

BACKGROUND OF THE INVENTION

1. Field of the Invention

The present invention relates to an improved program delivery control (PDC) system, that is, a system or method of transmitting labels identifying particular programs which are used to control domestic receiving equipment such as video cassette recorders.

2. Description of the Related Art

There exist already PDC methods in which program labels are transmitted frequently and, in some cases, at regular intervals, during the program. In the case of television, the labels may be carried by a dedicated line in the vertical blanking period (as in the German VPS system) or as part of the teletext service as, for example, the broadcast service data packet defined for CCIR system B teletext. Where the broadcast programs are radio programs, the labels may be carried by the RDS (radio data) system.

The transmitted labels are, as indicated above, used to control receiving equipment, in particular, video cassette recorders, which are caused to respond to particular program labels and to operate while those labels are being transmitted. In essence, a video cassette machine may record incoming programs only while predetermined labels are being transmitted. More sophisticated video recorders may also establish a 'time window' during which the equipment may respond to a particular label and may incorporate a 'fly-wheel' method of operation so that the occasional loss of a label in the received signal does not cause recording to be interrupted or to cut off prematurely.

One existing system, described in United Kingdom patent application No. 8821619 filed 15th Sep. 1988 describes a system of conditional access to a PDC service in which the program labels are varied continuously and systematically. Only equipment having a corresponding key and/or sequence generator can recognize the sequence of labels identifying a given program.

One problem that arises with such systems is that there may be an appreciable delay between detection of the first program label and commencement of actual operation of the video. This leads to the first few moments of a program not being recorded European Patent Application No. 0214326 (Eitz) describes a system in which a 'special' label is transmitted at a predetermined time before an upcoming change of program content. A similar system is described in Heller (German patent B328001). In both cases the 'special' label is transmitted before the program change at regular intervals. These systems are, however, vulnerable to disruption by mis-transmitted signals. If, for example, a 'special' label is missed, the start-up of the video recorder may be mistimed relative to the actual beginning of program because the first label after a break in the sequence may be treated as the first of the sequence, leading to late start-up of the recorder.

SUMMARY OF THE INVENTION

In a first aspect, the invention provides a method of labelling a broadcast signal in which a sequence of program labels indicative of the program content are transmitted periodically. At a predetermined time prior to change in program content of the broadcast signal, a plurality of labels different to those identifying the current program are introduced into the sequence of program labels. The plurality of different labels are transmitted at irregular intervals to form a predetermined pattern detectable by apparatus receiving the broadcast signal. Thus, when the receiver detects the irregular pattern of different signals, it can operate the required function of the receiver, for example, the on/off switch, at a predetermined time after the pattern has been detected. If a suitable pattern is chosen, it can be detected reliably, even if one of the labels forming the pattern is missing or mis-timed. Ideally, the pattern is chosen to have a high auto-correlation function (that is, the bit-by-bit comparison between the pattern and the same pattern displaced by an integer number of periods of the label sequence) has a single well-defined maximum with no 'false matches'. With such a pattern, as mentioned above, the point of program change can still be inferred precisely even if one or two labels are wrongly received. Moreover, the pattern can be transmitted a long time in advance of the actual program change, for example, half a minute, without disturbing the operation of a simple decoder which is still looking to detect the labels identifying the current program. The labels for the new program need only be transmitted infrequently and, deliberately, irregularly.

In a further aspect, the invention provides a method of operating a broadcast receiver in which a sequence of periodically transmitted program labels indicating the program content of a broadcast signal are received with said signal. A predetermined pattern of different labels identifying new program content is detected in the sequence of received program labels and at least one function, for example, the on/off switch of the receiver is operated in response to detection of the predetermined pattern of different labels, at a predetermined time after their detection.

A program delivery control system in accordance with the invention will now be described in detail, by way of example, with reference to the drawings, in which:

DESCRIPTION OF THE PREFERRED EMBODIMENTS

Figure 1:
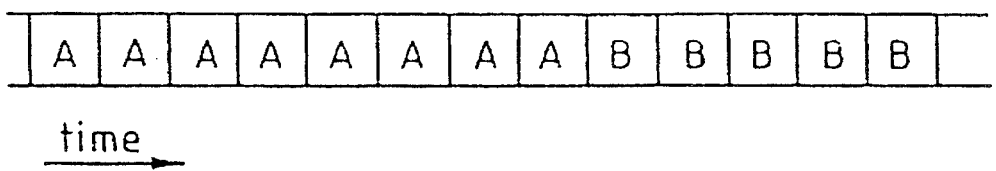
FIG. 1 is a schematic diagram showing the program labels at a program change in a conventional PDC system.

FIG. 1 shows the changing sequence of program labels at a change in a conventional program delivery control system from a program identified by label A to a program identified by means of label B. The sequence of labels around the change is . . . AAABBB . . . .

Typically, the decoder at a video cassette recorder is set up to respond to three correct recognitions of the label for a desired program so that, if labels are transmitted at one second intervals, as is usual, the recorder will start to respond to the change of program label two to three seconds after the second program, identified by label B, begins. Similarly, the stop operation, which would be initiated by three consecutive incorrect labels, would be subject to the same delay. In practice, the delay is likely, in fact, to be greater because the mechanical response time of the receiving equipment must be added to the delay due to recognition of the label change.

Figure 2:
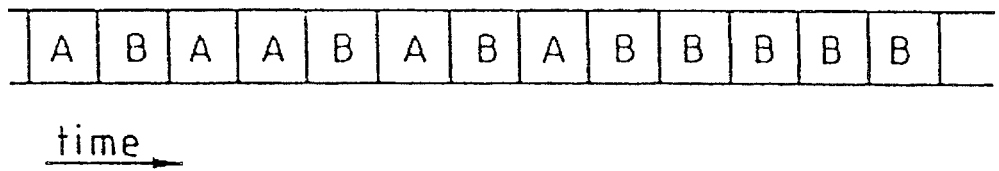
FIG. 2 is a schematic diagram showing the program labels at a program change in the PDC system of the invention.

FIG. 2 illustrates a program delivery control system in accordance with the invention in which a predetermined pattern of special labels is introduced into the sequence of program labels transmitted to signal the imminence of a change in the program transmitted.

As shown, the special label signalling the change of program content, "B", is transmitted 7 seconds before the change, again 4 seconds before and again 2 seconds before the change. Thus, the label B is transmitted repeatedly and at irregular intervals, in this case, after 3 seconds, after 2 seconds and, again, after 2 seconds. After the actual program change of course, the label B is transmitted continuously at one second intervals until the next program change is imminent.

For ease of illustration, only a very short pattern of special labels B is shown but, as mentioned above, the pattern may start a while before the program change, for example, half a minute or so before the program change, or the special labels B may be more widely spaced. This latter arrangement has the advantage that transmission of the labels B is less likely to disrupt operation of a receiver dependent on detection, for example, of three sequential labels the same to continue operation.

It will be understood that it is not so much the content of the special labels B which is important, but, rather, the pattern they form within the overall sequence of program labels being transmitted. By choosing a suitable pattern with an auto/correlation function having a single clear maximum, the possibility of a false 'detection' of the pattern becomes slight. Detection of the required pattern then signals unambiguously when an event or change in program content is to occur.

A conventional decoder set up simply to recognise a change in the program label will respond in the same way as it would to a conventional sequence of program labels at a program change. Under very severe error conditions, i.e. the worst possible case, a conventional decoder might cause recording to stop a few seconds early or to stop and start repeatedly over the period during which the pattern of special labels B was being transmitted.

While the example described above is concerned with an imminent change of program patterns of special labels might also be used to signal interruptions in a program, for example, for a commercial break, and resumption of an interrupted program. Instead of using patterns of labels indicative of the next following program, as described, it would also be possible to use patterns of special labels of a different kind to indicate upcoming events in the transmitted program.

What we claim is:

1. A method of labelling a broadcast signal, the method comprising:

transmitting a sequence of program labels indicative of the identity of the program being transmitted as said broadcast signal, said program labels being transmitted periodically; and introducing into the sequence of program labels, at a pre-determined time prior to a change of program of said broadcast signal, a plurality of labels, different to those identifying the program being broadcast before said change of program, identifying a new program to be broadcast after the said change of program, said plurality of labels being transmitted at irregular intervals to form a predetermined pattern detectable by an apparatus for receiving said broadcast signal.

2. A method according to claim 1 wherein transmission of said plurality of labels serves to indicate that a new program is to commence after said predetermined time.

3. A method according to claim 1 wherein transmission of said plurality of labels serves to indicate that the program currently being transmitted is to end after said predetermined time.

4. A method according to claim 1 wherein transmission of said plurality of labels serves to indicate that the program currently being transmitted is to be interrupted after said predetermined time.

5. A method according to claim 1 wherein transmission of said plurality of labels serves to indicate that a program broadcast previously is to be resumed after said predetermined time.

6. A method according to claim 1 wherein the pattern defined by said plurality of labels is chosen to have an autocorrelation function having a single maximum.

7. A method of operating a broadcast receiver, the method comprising:

receiving a broadcast signal;

receiving a sequence of periodically transmitted program labels indicative of the identity of the program being transmitted as said broadcast signal;

detecting in said sequence of program labels a predetermined pattern of different labels identifying a new program to be transmitted as said broadcast signal;

and operating at least one function of said broadcast receiver, in response to detection of said predetermined pattern of different labels, at a predetermined time after detection thereof;

said predetermined pattern of different labels being transmitted at irregular intervals.

* * * * *